No. 839,220. PATENTED DEC. 25, 1906.
J. R. SPEER & G. H. HARVEY.
APPARATUS FOR MANUFACTURING GLASS.
APPLICATION FILED APR. 20, 1906.
3 SHEETS—SHEET 1.
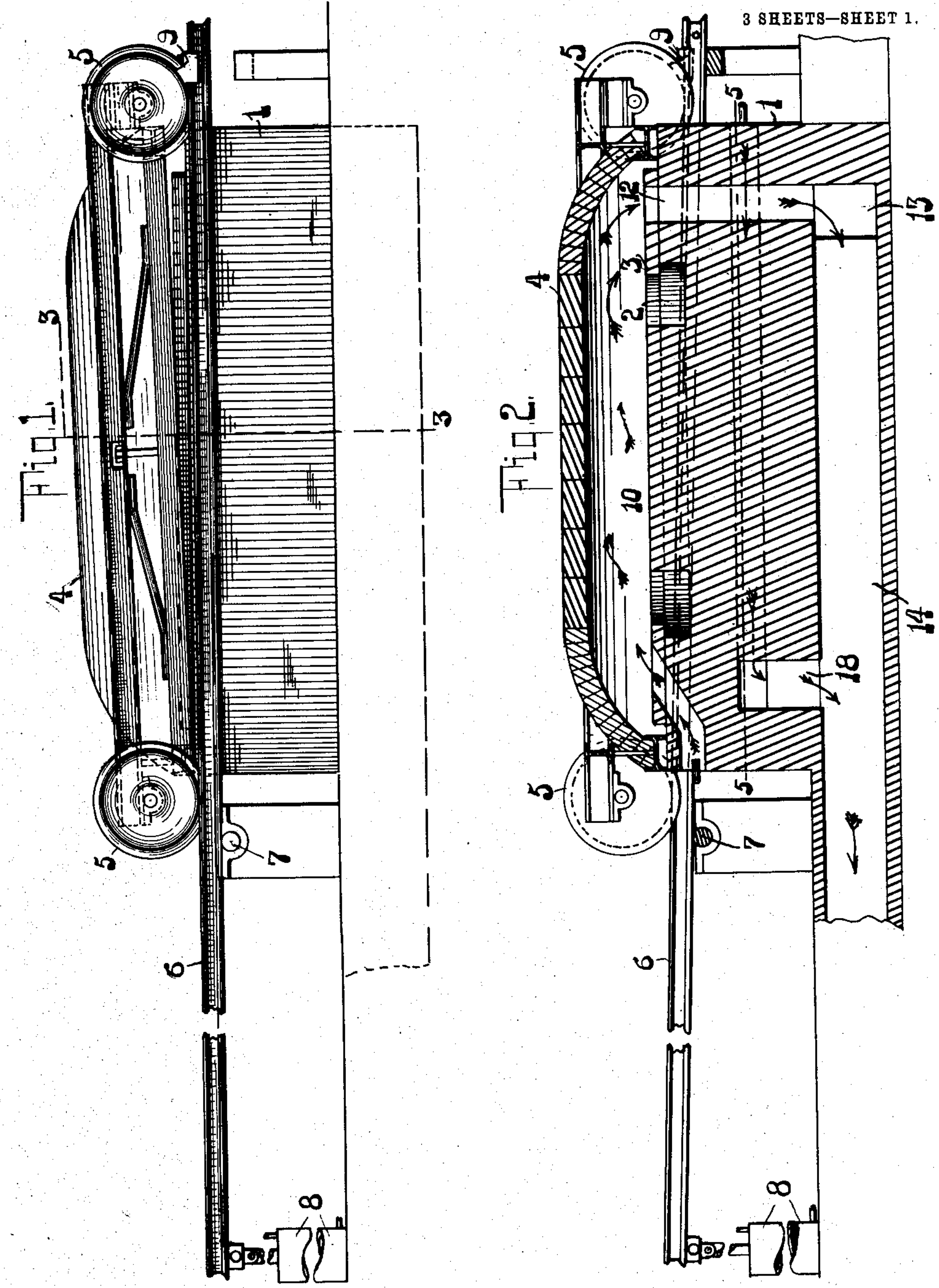
Witnesses:
C. B. Meharg
Elva Stanick
Inventors,
J. R. Speer and G. H. Harvey
by their Attorneys
Pierce & Barber No. 839,220. PATENTED DEC. 25, 1906.
J. R. SPEER & G. H. HARVEY.
APPARATUS FOR MANUFACTURING GLASS.
APPLICATION FILED APR. 20, 1906.
3 SHEETS—SHEET 2.
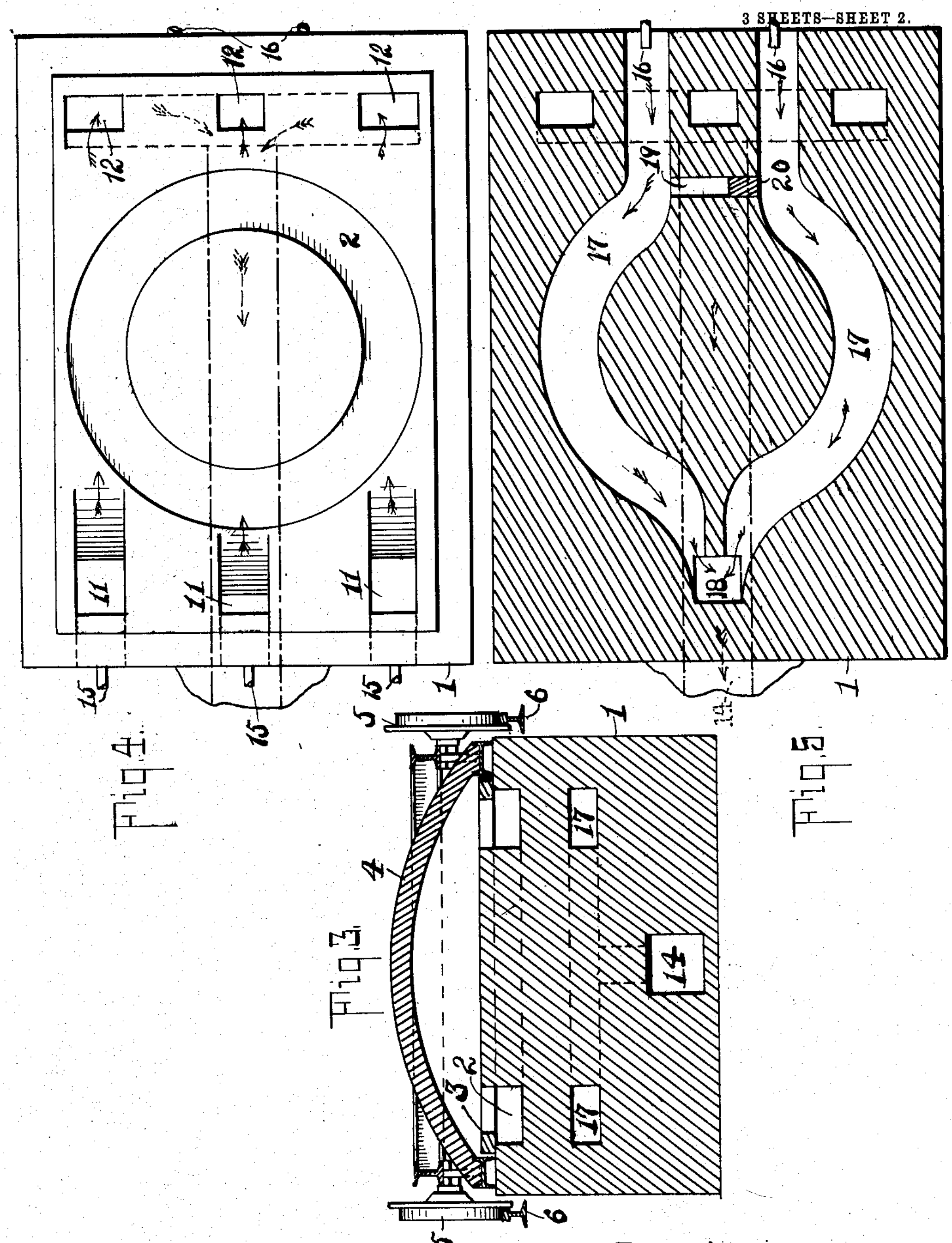
Witnesses:
C. B. Mehard
Elva Stanick
Inventors,
J. R. Speer and G. H. Harvey
by their Attorneys
Pierce & Barber No. 839,220. PATENTED DEC. 25, 1906.
J. R. SPEER & G. H. HARVEY.
APPARATUS FOR MANUFACTURING GLASS.
APPLICATION FILED APR. 20, 1906.
3 SHEETS—SHEET 3.
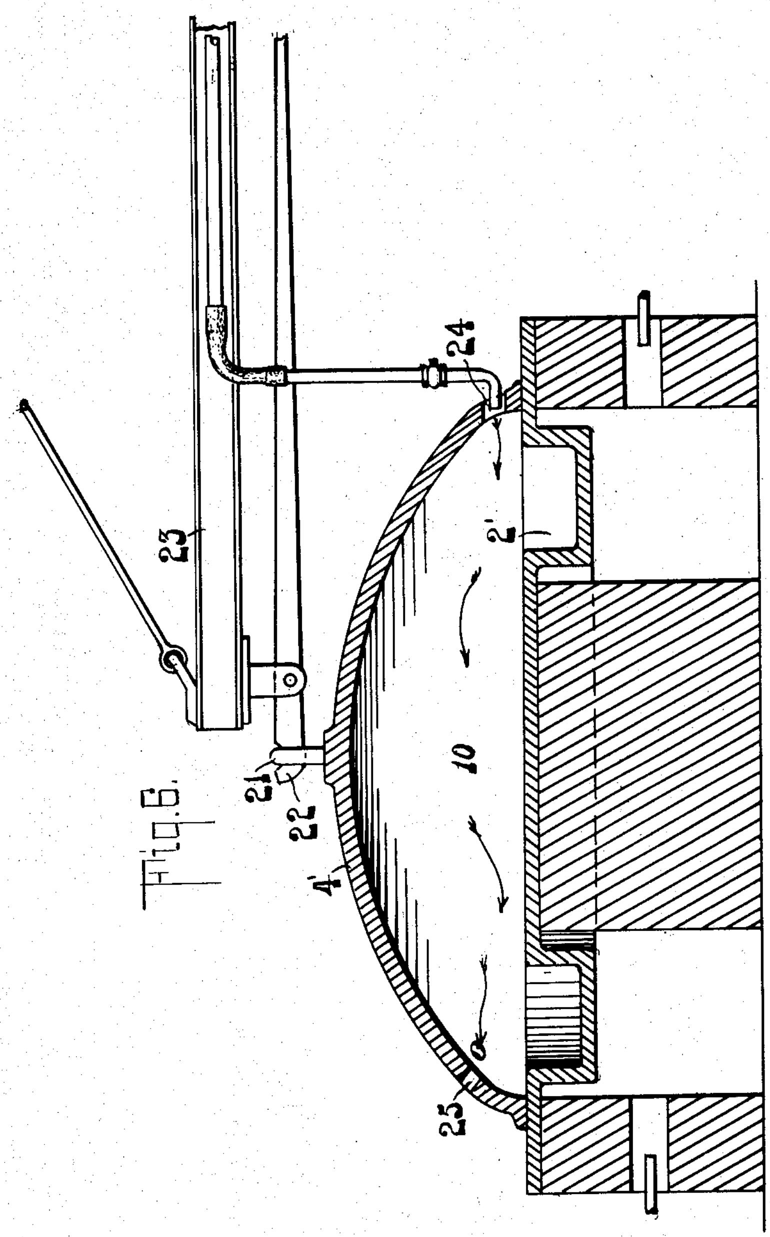
Witnesses:
C. G. Mehard
Elva Stanick
Inventors,
J. R. Speer and G. H. Harvey
by their Attorneys
Pierce & Barber

UNITED STATES PATENT OFFICE.

JAMES RAMSEY SPEER, OF PITTSBURG, AND GEORGE H. HARVEY, OF GLENFIELD, PENNSYLVANIA, ASSIGNORS TO BROWNSVILLE GLASS COMPANY, OF PITTSBURG, PENNSYLVANIA, A CORPORATION OF PENNSYLVANIA.

APPARATUS FOR MANUFACTURING GLASS.

No. 839,220. Specification of Letters Patent. Patented Dec. 25, 1906.

Application filed April 20, 1906. Serial No. 312,790.

*To all whom it may concern:*

Be it known that we, JAMES RAMSEY SPEER, residing at Pittsburg, and GEORGE H. HARVEY, residing at Glenfield, in the county of Allegheny and State of Pennsylvania, citizens of the United States, have invented or discovered new and useful Improvements in Apparatus for Manufacturing Glass, of which the following is a specification.

Our invention relates to apparatus for preparing molten glass for the operation of drawing the same into cylinders, flats, or other shapes.

Heretofore it has not been the practice to draw cylinders much exceeding eighteen inches in diameter. This restriction in size is to a large degree due to the erroneous notion that it is necessary after each drawing operation to reheat the residue from the last drawing operation and drain the drawing-receptacle before supplying the latter with a fresh batch of glass. To reheat the pots or receptacles, they are sometimes lowered into the furnace and tilted, so that the residue may be drained off thoroughly. Sometimes they are reversed in their drawing positions. Such operations with receptacles five or six feet or more in diameter are not readily made, especially with receptacles composed of brick, tile, or similar material, and with metallic receptacles their weight and the large space they would require for such operations render them less satisfactory than if small receptacles were employed.

We find that it is not necessary to drain the receptacle after a drawing operation to prepare properly for a succeeding operation. We prefer that the drawing-receptacle be stationary and that there shall be provided therefor a cover, which, with the receptacle, is so shaped as to form a fire or combustion chamber therebetween, so that the heat shall be radiated upon the surface of the glass. The receptacle and the cover are made so that one, preferably the cover, is removable in order to expose the glass for the drawing operation. We may also heat the glass in the receptacle by conduction through the walls thereof.

We find that the residue before mentioned may be perfectly remelted or reheated, so that it shall form a homogeneous mixture with the new batch of glass added to it for the next succeeding drawing.

The common practice has been to bring the drawing-pot up to a high degree of heat, then to pour the heart of the molten glass contained in a ladle into the pot, at the same time endeavoring to prevent the chill or partly-solidified glass which forms on the exterior, bottom, and walls of the ladle from going into the pot, and later to draw the sheet or cylinder from the pot. The above practice is a poor makeshift in a commercial sense and tends to make the result of every pour of molten glass into the pot and every draw therefrom a matter of chance, for the following reasons: If the pot is too hot, blisters appear which spoil the product. If the pot is not sufficiently hot, the molten glass stiffens as it is poured upon the bottom of the pot and will not spread uniformly, causing the drawn glass to be of variable thickness. If the ladler pours in any of the chill, it will produce ropy or thread-like portions in the drawn glass. Any of these defects are liable to occur at every pour, to overcome which is the object of our invention.

In the practice of our invention after the initial draw we preferably reduce the adhering end of the detached drawn glass, which is to all intents solidified, to a drawing condition by covering the pot or receptalce and applying heat directly to the glass. We then remove the cover, and preferably pour the contents of the ladle, including the chill, into the receptacle and replace the cover. The heat is sufficient to reduce the glass to the proper consistency when the cover is removed and the draw made. Thus we obviate all danger of spoiling the contents of the receptacle and assure molten glass of the desired consistency and uniformity for drawing perfect sheets or cylinders.

Referring to the drawings, which form a part of this specification, Figure 1 is a side elevation of one of the many forms which our invention may assume. Fig. 2 is a longitudinal vertical section of the same. Fig. 3 is a transverse section on the line 3 3 of Fig. 1. Fig. 4 is a plan of Fig. 1 with the furnace-cover and the track omitted. Fig. 5 is a horizontal section taken on the line 5 5 of Fig. 2, and Fig. 6 is a vertical section of a modification of our invention.

Referring now to Figs. 1 to 5, 1 represents the body of the furnace, which has at the top the annular recess or glass-holding receptacle 2 of a suitable depth and width to contain the quantity of glass necessary to produce an article of the required length and thickness. Preferably the receptacle will have its upper portion somewhat narrowed, so as to provide the overhang 3, which prevents to a degree the entrance of air into the receptacle during the drawing operation, thus causing the glass to be somewhat more fluid and in a better condition for drawing at the line where the glass commences to be lifted from the receptacle as it is drawn. The receptacle 2, as shown on Figs. 1 to 5, is an integral part of the body of the furnace; but it may be constructed of a separate part, as shown in Fig. 6, hereinafter to be described. The cover 4 for the furnace is mounted on the wheels 5, which run on the track 6. This track is pivoted intermediate of its ends on the shaft 7 and is rotated on this shaft by means of the motor-cylinder 8 or in any other approved manner. In Fig. 2 the cover 4 is shown seated on the furnace-top over the receptacle 2. When it is desired to remove the cover, the track is tilted from the inclined position shown in Fig. 2, so as to cause the cover to run upon the track away from the furnace toward the cylinder 8. When it is desired to place the cover on the furnace, the track is tilted to cause the cover to run toward the furnace, the stops 9 being placed upon the rails, so as to cause the cover to come to rest at the proper place over the furnace, whereupon the track is tilted to lower the cover upon its seat on the furnace. In order to heat the glass in the receptacle 2, the cover 4 is concave or arched, so as to form a heating-chamber between the cover and the receptacle, the said chamber being, in fact, composed of said cover and the upper portion of the body 1, which contains the said receptacle. Gas is admitted to the said chamber 10 through the inlet-ports 11 and passes out therefrom through the waste-ports 12, which extend vertically through the furnace-body and lead into the transverse passage 13. This passage 13 opens into the horizontal passage 14, leading to the stack. 15 represents burners or supply-pipes for conducting the gas to the inlets 11. In order to heat the bottom of the receptacle 2, we provide the burners 16, which introduce gas into the horizontal passages 17, lying beneath the recess or receptacle 2, as shown in Fig. 5. These passages lead into the vertical passage 18, which opens into the aforementioned passage 14. In case it should be desirable to heat the portion of the recess or receptacle 2 which lies between the inlet ends of the passages 17, we have provided the cross-passage 19, connecting the two said passages 17 directly under the recess 2. If the cross-passage 19 is not desired, it may be omitted or partially filled with brick or tile 20, as shown on Fig. 5.

When it is desired to draw a glass cylinder, the cover 4 is seated on the furnace, as shown in Figs. 2 and 3. The gas is turned on at the several burners and ignited and the receptacle heated to a sufficient degree to receive a batch of molten glass. The cover 4 is then removed from the furnace in the manner hereinabove described and a batch of molten glass poured into the receptacle. If the glass in the receptacle is not sufficiently heated for drawing, the cover is replaced on the furnace and the heating continued until the glass reaches the proper temperature or fluidity. The cover is then removed and the drawing made in any desired manner. After the drawing has been completed the drawn article is severed from the glass which remains in the receptacle. This remaining portion of glass has heretofore given rise to much difficulty, because it would not properly become fused and amalgamated with the next batch of molten glass poured into the receptacle, causing the next article drawn to be worthless by reason of its stringy or ropy character. In order to avoid this stringy or ropy character of the glass, it has been common hitherto to lower the glass-receptacle into a furnace or to tilt it or to invert it in a furnace, so as to reheat the same and cause the residue of the glass therein to run out. After the receptacle was thoroughly reheated and freed from the said residue it was again brought into the drawing position and refilled with glass for another drawing operation. By our invention we avoid the stringy or ropy character of the glass, and preferably do not lower, tilt, or rotate our receptacle for the purpose of reheating the same or melting the residue of glass therein. It is only necessary to replace the cover on the furnace over the receptacle and reheat at once the receptacle and the residue, this reheating preferably taking place before the glass for the next drawing operation has been poured into the receptacle.

It is not convenient in the drawing of glass cylinders of extraordinary size to provide mechanism for moving the receptacle into a position other than its working position for the purpose of reheating it. We are drawing cylinders five or six feet or more in diameter, and it will be readily seen that it would be somewhat hazardous to invert pots or receptacles composed of brick, clay, or the like for drawing glass cylinders of such extraordinary diameters, and it would be inconvenient to provide mechanism for inverting or tilting pots or receptacles composed of metal.

Referring now to Fig. 6, the receptacle 2′ is shown as composed of a plate having an annular depression therein to contain the necessary amount of glass for a drawing operation; but it is to be understood that the receptacle may be constructed as shown in the remaining figures of this application or in any other desired manner. The cover 4′ is shown provided with means, as the eye 21, into which fits the hook 22, carried by the boom or jib 23 of a crane or by any other desired mechanism. Gas is admitted through the cover by one or more openings 24, and the products of combustion escape from said cover through one or more passages 25 therein. It is not material to our invention how the gas is admitted into or taken from the chamber above the receptacle, as these are details which may be worked out in various manners. The operation of the apparatus shown in Fig. 6 does not differ essentially from that shown in the remaining figures.

We do not desire to be limited to the precise manner of conducting the gases through the furnace structure, although we prefer the method shown. The passages through the furnace structure may be variously constructed and connected so long as they are arranged to heat the glass properly while in the receptacle.

It is clear that our invention may be applied to the making of sheet-glass, commonly called "flats," by simply changing the outline of the receptacle and the gas-passages.

We believe that by not inverting the receptacle for the purpose of melting out the residue of glass left after each drawing operation we avoid the formation of blisters or large bubbles. When a pot or drawing-receptacle is subjected to the direct action of the flames, as in the usual methods, its surface is too highly heated where it is necessary, as in these old methods, to maintain a temperature through the body of the pot or receptacle to enable the glass to remain fluid enough to permit the drawing operation. The bad effect of this excessive heating is noticeable by the number and size of the blisters or bubbles which are formed when a fresh batch of glass is poured upon the highly-heated surface of the pot or receptacle. These blisters have a most decided effect upon the surface of the finished product, and up to the present time no satisfactory means for preventing this has been discovered. By our method, owing to the fact that the reheating can easily be done both before and after a batch of glass has been ladled into the pot, it is not necessary to overheat the pot, as the other methods require. We leave a small amount of glass in the receptacle, which has a very beneficial effect when being reheated, and when the new batch of glass is poured in upon it the tendency to form blisters or bubbles is almost entirely done away with. The application of the heat on the top of the glass to be reheated, as in our practice, has a further beneficial effect in doing away with any air-bubbles which may occur in pouring to the surface, where they naturally pass off and give no trouble.

Having described our invention, we claim—

1. The combination of a receptacle to contain glass to be drawn, a heat-radiating chamber above said receptacle, a cover constituting a portion of said chamber, and traveling means for raising said cover vertically and then removing it laterally.

2. The combination of a receptacle to contain glass to be drawn, a heat-radiating chamber above said receptacle, a cover constituting a portion of said chamber, and means traveling substantially horizontally for removing said cover.

3. The combination of a receptacle to contain glass to be drawn, a heat-radiating chamber above said receptacle, a removable cover constituting a portion of said chamber, means for removing the cover horizontally, and means in the receptacle for the introduction into said chamber of the gases of combustion, and means in said receptacle for removing from said chamber the products of combustion.

Signed at Pittsburg, Pennsylvania, this 17th day of April, 1906.

J. RAMSEY SPEER.
GEORGE H. HARVEY.

Witnesses:
F. N. BARBER,
C. E. EGGERS.